1

2,703,759

PECTIN COMPOSITION

Herbert T. Leo and Clarence C. Taylor, Anaheim, Calif.

No Drawing. Application August 12, 1952,
Serial No. 304,006

3 Claims. (Cl. 99—132)

This invention relates to a pectin composition, and more particularly to a household pectin composition that is adapted for many purposes, including jelly and jam and the making of custards and aspics.

In our copending application Serial No. 235,376, filed July 5, 1951, we have disclosed and claimed a jelly making composition comprising a dry, granular admixture of a non-water soluble pectin of a particle size coarser than 100 mesh, of an edible alkali metal salt of an organic oxy acid in an amount sufficient to effect complete solution of all of the pectin content in plain water, and of an edible oxy acid in an amount sufficient to impart a pH of between 2.2 and 4.0 to a water solution of the admixture. The jelly making composition of the pending application referred to has a jelly grade of between 50 and 150 and is capable of being readily dispersed in hot water to dissolve completely therein within five minutes.

The present pectin composition is similar to the jelly making composition of the pending application referred to insofar as the type of pectin and its physical properties are concerned and the present pectin composition also contains a solubilizing agent, such as sodium citrate. The principal difference between the two compositions lies in the larger proportion of high grade pectin, with the resulting required use of less or no dextrose to standardize the final composition to a jelly grade of about 200, and the omission of the edible organic acid in the present pectin composition. These differences make possible a pectin composition having a more universal usefulness than the jelly making composition of my pending application. The pectin composition of this invention has, as a whole, a jelly grade of at least 150 and preferably of about 200, and is capable of being dissolved completely in cool tap water, without heating, to give a pH of between 3.50 and 4.40. An amount of an edible alkali metal salt of an organic oxy acid, such as sodium citrate is incorporated into the present pectin composition in an amount sufficient to give a pH within the range specified, when 7.1 grams of the pectin composition are dissolved in eight fluid ounces of water.

By providing a high jelly grade pectin composition having a pH, when dissolved, within the range indicated, we make pectin available to the housewife in a form that lends itself to the many uses above enumerated. Instead of being useful in the making of jams and jellies only, as in the case of the jelly making composition of our copending application, our present pectin composition can not only be used for making jams and jellies but also candies, milk custards, aspics and other products that in the past required separate types of pectin, such as specially demethoxylated pectin.

In the case of milk custards, and other dessert or salad products where the presence of calcium or magnesium salts is relied upon to set the pectin, the housewife need only add to a solution of our pectin a sufficient amount of baking soda to bring the pH of the solution to between 5.8 and 7.0 and then subject the pectin in the solution to enzymatic action, as by the use of an aqueous extract prepared from grated carrots. By varying the time of the enzymatic action on the pectin, the firmness of the set of the resulting custard or the like may be varied.

The fact that our pectin composition can be used without sugar, or with any desired small quantity of sugar, makes it of particular value in making custards and other desserts, salads, salad dressings and the like for consumption by diabetics or by those on a weight-reducing diet. Starch-free custards and puddings can be made from our pectin composition that require no sugar and no refrigeration yet can be set to any degree of firmness that may be desired.

In addition, solutions of our pectin composition may be used as such for application to dry cereals and other food products for the beneficial effect that the pectin has upon the gastro-intestinal tract. For this purpose the amount of pectin in a one-quarter ounce package of our composition is equivalent to the proto pectin content of sixteen pounds of fresh oranges.

It is therefore an important object of our invention to provide a pectin composition of high jelly grade and of substantially universal usefulness for many old and new purposes and in the making of various products for which the housewife has previously had to purchase different types of pectin.

It is a further important object of this invention to provide a pectin composition that is of at least 150 and preferably 200 jelly grade strength and that is capable of being dispersed rapidly and dissolved completely with great ease in cool plain water to give a pH within the range of between 3.50 and 4.40, the solution so prepared being directly useful as such, and also in the making of such varied products as jellies, candies, custards and aspics.

Other and further important objects of this invention will become apparent from the following description and appended claims.

The pectin used in our composition is what we term a "non-water soluble pectin." The term "non-water soluble" will be hereinafter defined. Preferably, the pectin used is a substantially non-demethoxylated one that has been precipitated from a pectin extract made from citrus fruit, by the addition thereto of a soluble aluminum salt and by the proper control of the pH to bring about a coprecipitation of pectin and aluminum hydroxide as a pectin-aluminum complex. This complex comes out of solution as a curd, which is dropped into 40% alcohol to harden. After being hardened, the co-precipitate can be easily broken up into small pieces.

The broken-up pectin-aluminum complex is then washed with acidified alcohol to remove more or less of the aluminum present as $Al(OH)_3$. A sufficient amount of acidified alcohol having a pH of between 0.5 and 2.0 and preferably 1.25 is used to reduce the aluminum content of the pectin to a point at which the pectin still is not soluble but will disperse readily in plain water, either hot or cold, particularly when of a particle size coarser than 100 mesh, and preferably between 30 and 80 mesh. This property of dispersibility is due, first, to the water insolubility of the pectin and, secondly, to the coarser particle size, to which we intentionally grind our pectin. The pectin is inherently of a porous character when prepared from a pectin-aluminum complex in the manner described, and this porosity is important in enabling the housewife to obtain complete dissolution of the composition containing sodium citrate, merely by stirring it into plain cool water to thoroughly disperse it and then letting the suspension stand for about 20 minutes.

After the last acidified alcohol wash, the pectin is brought to a somewhat higher pH, say, to around a pH value of 3.30 by the addition of ammonia to the final alcohol rinse. It is preferable not to use sodium lactate to adjust the pH of the pectin since lactic acid is an oxy-acid and its presence would lead to complications in the use of the pectin due to its solubilizing action on the pectin. The pectin of our composition must be one that is non-soluble in water in accordance with the definition hereinafter given for non-water solubility, yet must be a pectin that can be solubilized by the use of between 2 and 10% of sodium citrate by weight of an equivalent amount of 100 grade pectin. This will be explained later in greater detail.

After the adjustment of the pH of the pectin to around a pH of 3.30 by the use of ammonia, the washed, porous pectin is dried, ground to a relatively coarse size, screened to collect all particles between about 30 and 80 mesh, and the coarser particles reground and rescreened. Anything finer than about 100 mesh is separated for a different use. The result is a non-water soluble pectin in granular form of a particle size less than 100 mesh and substantially all between 30 and 80 mesh. While a coarser grind, down as low as 10 mesh, can be used, it is preferable to employ a particle size that is free of any substantial proportion of fines above 100 mesh and of any substantial proportion of coarse particles that do not pass through a standard 30 mesh screen.

Since, to the best of our knowledge, there is no standard or accepted test for determining the fact that a given pectin is soluble or not soluble in plain water, we are giving herewith the test that we use:

SOLUBILITY TEST 28.4 grams of a 100 grade pectin, or an equivalent weight of a higher grade pectin are added to a pint of plain water. Two such pint lots are separately prepared and stirred in a Waring Blendor or equivalent device providing vigorous agitation for a couple of minutes, but to lot No. 1 no addition is made while to lot No. 2 are added 1.4 grams of tartaric acid and 1.4 grams of sodium citrate, while stirring. 125 grams respectively of each of lots No. 1 and No. 2 are then added to separate but identical hot batches of sugar and water in kettles, each consisting of 500 grams of sugar (ordinary cane sugar) and 170 ml. of water. After boiling to exactly 777 grams to give a 65% sugar content, each batch is tested for quality of jelly by pouring from the kettles into 6 ounce jelly glasses, two of which contain 2 ml. of 50% tartaric acid solution to give a finished jelly of about 2.50 pH, and two of which contain 2 ml. of 50% citric acid solution and 0.5 ml. of 25% sodium citrate solution to give a finished jelly of about 3.0 pH.

If, under these conditions, lot No. 1 does not form a satisfactory firm jelly in either of the glasses into which it is poured, whereas lot No. 2 does, then the pectin tested is a non-water soluble pectin within the meaning of the term as used herein, and is satisfactory for our purposes. If both lots give equally satisfactory firm jellies, then the pectin tested is water soluble and is not suitable for use in our composition.

The following examples will serve to illustrate pectin compositions coming within the scope of our invention. Percentages are expressed as percentages by weight.

*Example I.—200 grade*

| | Per cent |
|---|---|
| 240 grade pectin (30–80 mesh) | 83.3 |
| U. S. P. granular sodium citrate (30–80 mesh) | 10.0 |
| Dextrose (30–80 mesh) | 6.7 |
| —200 grade | 100.0 |

The composition above specified must meet the following tests:

(1) 7.1 grams of the composition must dissolve in 8 fluid ounces of cool tap water without heating.

(2) The pH of the resulting solution must be between 3.50 and 4.40.

Since complete dissolution of a given pectin is somewhat difficult to ascertain, we apply the following test:

If the pectin is completely in solution, the solution is substantially clear and when poured slowly forms a continuous, clearly transparent stream tapering progressively from the pouring source to almost hair-like thinness without breaking its continuity. This is termed "stringing." A pectin that is not completely water soluble may appear to dissolve in water but will not "string" to give the continuous, fine stream on slow pouring. Further, an incompletely dissolved pectin will impart a pearl-like appearance to a mass of water into which it has been stirred, and a pebbly appearance in thin films, such as those formed during stirring on the wall of the beaker or glass container. In stating that our pectin composition completely dissolves in cool tap water, we judge completion of solution in accordance with the foregoing. When the solution is substantially clear, except for air bubbles, is free from a pearl-like appearance when viewed as a mass, and free from pebbly appearance when viewed in thin films, and gives a stream tapering to hair-like thinness, it is considered to be in complete solution.

Since our pectin composition is particularly intended for use in the home, it must meet certain tests as to its ease of dispersibility and of complete solubility in plain tap water. The directions for use of our pectin composition are to stir the entire contents of the envelope in which it is packaged which amounts to 7.1 grams (¼ oz.) of the composition, into 8 fluid ounces of cool tap water and continue to stir the resulting suspension for at least one minute. The stirring, which may be accomplished by means of a spoon, need not be vigorous since gentle stirring is sufficient. Owing to the relatively coarse particle size of the pectin and its non-water solubility, the pectin disperses immediately, forming a suspension of discrete particles. During the minute of stirring, these discrete particles become sufficiently hydrated, as evidenced by their swelling in size, that the particles will not thereafter settle out of suspension even though the stirring is discontinued at the end of the one minute period. The further directions are to let the suspension stand for a full 20 minutes, after cessation of stirring, to effect complete solution. Consequently, in every case complete solution must take place during this additional time period or an unsatisfactory jelly might result.

The assurance of complete solution by the method described within the period of time specified is due to:

1. The non-water solubility of the pectin and its relatively coarse particle size, and the fact that both the pectin and the solubilizing agent (sodium citrate or an equivalent thereof) are substantially of the same particle size, thereby facilitating dispersion of the pectin, without lumping or agglomeration, to form a suspension of discrete pectin particles; and 2. The porous character of the pectin, which enables hydration and accompanying swelling to take place rapidly during the preliminary dispersing step, so that the pectin particles will remain suspended after the cessation of stirring; and it is this same porous character which enables subsequent rapid dissolution of the pectin to take place both from the inside and outside of each suspended pectin particle.

As contrasted with the ease of dispersion and dissolution of our pectin composition, if one were to use a water-soluble pectin in place of our non-water soluble pectin, or were to use a very finely ground sodium citrate with our pectin, lumping would take place upon attempting to stir these other compositions into water and the housewife would be unable to get such compositions into complete solution. While complete solution of any of these other compositions could be effected by very vigorous mechanical agitation, our object is to provide a pectin composition of such ready dispersibility and solubility as to obviate the necessity of using special mixing or agitating equipment. All that is required of the housewife with our composition is one minute of gentle stirring with a spoon and thereafter dissolution takes place automatically. The initial stirring is, however, essential, since if the pectin composition of our invention were merely dumped into plain water, either hot or cold, with no more than a single stirring movement with a spoon, or only a few such stirring movements, the pectin particles would then promptly settle to the bottom and form a gum-like layer that could not easily be put into solution by any reasonable amount of subsequent stirring with a spoon. These phenomena serve to distinguish our pectin composition from all heretofore known pectin compositions.

Other compositions within the scope of our invention will, like that of Example I have a jelly grade of at least 150 and will be made from a pectin having a jelly grade of at least 220, but instead of sodium citrate, other edible salts of an alkali metal and a hydroxy substituted organic acid may be used, such as potassium or sodium tartrate, so long as they are available as dry solids for admixture with dry pectin of the character hereinabove described. From the standpoint of economy, it is preferred to use a pectin of at least about 220 grade and one capable of being completely solubilized by 2 to 10% of sodium citrate by weight on the basis of 100 grade pectin equivalency to the amount of pectin of the particular jelly grade actually present in the composition.

In Example I, where a pectin of 240 jelly grade was used, this would mean that the percentage of sodium citrate, or its equivalent, should be between $$\frac{240}{100} \times 2$$

or a minimum of 4.8%, and $$\frac{240}{100} \times 10$$

or a maximum of 24%, by weight of the total composition, but since it is preferable for the pectin composition to have a jelly grade of at least 200, the maximum percentage of sodium citrate to be used with 240 grade pectin would be 16.7%, which would give a formula for the resulting composition, as follows:

*Example II*

|  | Per cent |
|---|---|
| 240 grade pectin (30–80 mesh) | 83.3 |
| Sodium citrate (30–80 mesh) | 16.7 |
|  | 100.0 |

Similarly, if a 223 grade pectin were used, the maximum amount of sodium citrate would be as follows:

*Example III*

|  | Per cent |
|---|---|
| 223 grade pectin (30–80 mesh) | 90.0 |
| Sodium citrate (30–80 mesh) | 10.0 |
|  | 100.0 |

If the minimum amount of sodium citrate were used in Examples I, II, and III, the respective formulae would be as follows, for a 200 grade composition:

*Example IV*

(Corresponding to Examples I and II)

|  | Per cent |
|---|---|
| 240 grade pectin (30–80 mesh) | 83.3 |
| Sodium citrate (30–80 mesh) | 4.8 |
| Dextrose (30–80 mesh) | 11.9 |
|  | 100.0 |

*Example V*

(Corresponding to Example III)

|  | Per cent |
|---|---|
| 223 grade pectin (30–80 mesh) | 90.0 |
| Sodium citrate (30–80 mesh) | 4.5 |
| Dextrose (30–80 mesh) | 5.5 |
|  | 100.0 |

Since, however, the dextrose used for standardizing the pectin compositions to the desired jelly grade is not itself useful in or necessary to the making of the pectin solution or of the final jam, jelly, custard or other product, but is merely an added expense in the manufacture of our composition, it is preferable to eliminate the dextrose entirely, or reduce it to a minimum, and use sodium citrate, or an equivalent thereof, in an amount sufficient to bring the jelly grade of the composition as a whole to the desired minimum grade of 200, or at least to 150, without, however, exceeding the maximum figure of 20% sodium citrate based on equivalent 100 grade pectin in the formula. If more than 20% sodium citrate is used, the taste of the final product may be unfavorably influenced.

It is, of course, understood that by varying the pH of the final acidified alcohol rinse used in preparing our pectin, the proportion of sodium citrate to effect dissolution of the pectin may be varied, but this must still be kept within the limits of 2 and 10% on the 100 grade pectin basis, since if less sodium citrate than 2% is required, the pectin is too nearly water soluble and if more than 10% is required, the pectin is too water insoluble to be satisfactory for use in our composition.

If dextrose is used for standardizing our pectin composition, the dextrose should also be of a particle size between 30 and 80 mesh. When all the ingredients are of substantially the same particle size there is less tendency of stratification or of separating out of any of the ingredients during handling or use and therefore the composition is and remains more uniform at all times.

The universality of usefulness of the pectin composition of our present invention will be apparent from the following examples:

*Example VI.—French dressing recipe*

Measure 1 cup of cider vinegar into a pint jar or bowl and stir into the vinegar 7.1 grams of our pectin composition, such as that of Example I. Stir for one minute to disperse the pectin and set aside to dissolve the pectin, stirring occasionally.

Measure out and have ready the following:

1½ cups of salad oil, and a mixture of—
  1 teaspoon onion salt,
  1 teaspoon table salt,
  ½ teaspoon pepper,
  1 teaspoon garlic salt,
  1 teaspoon paprika,
  2 tablespoons sugar.

When the pectin is completely dissolved, put the solution into a rotary mixing bowl and add the foregoing dry mixture. Beat until the sugar is all dissolved. Continue beating and add the salad oil, ¼ cup at a time, beating well between additions, until all of the 1½ cups of salad oil are in.

This makes 2½ cups of wonderful French dressing, which will not separate upon standing.

*Example VII.—Salad dressing recipe*

Measure 1 cup of cider vinegar into a pint jar or bowl and stir into the vinegar 7.1 grams of our pectin composition, and continue the making of a solution of pectin as in Example VI.

Measure out and have ready:

1 pint of salad oil, and a mixture of the following dry ingredients—
  1½ teaspoons salt,
  1½ teaspoons dry mustard,
  3 tablespoons sugar.

Rub the dry ingredients together to make a smooth mixture.

Put ½ cup of undiluted evaporated milk into a beating bowl and blend in the dry ingredients with a rotary beater. Then add the 1 pint of salad oil, ¼ cup at a time, beating well between additions, until all of the salad oil is in and the mixture is smooth.

Finally, add the cup of the vinegar solution of pectin all at once and continue beating until smooth and thick. Keep the resulting salad dressing in a refrigerator except when using, but do not freeze.

This recipe makes about 2 pints of excellent, well-blended and stable salad dressing.

If desired, the salad dressing of this example and the French dressing of Example VI can be blended in any proportions to give variety in salad dressings.

*Example VIII.—Milk custard*

Measure ¼ teaspoon of baking soda into 1 cup of water in a bowl or pint jar and stir until dissolved. Stir into the baking soda solution 7.1 grams of our pectin composition, and continue the making of a solution of the pectin, as in Example VI.

Grate one or more carrots, using a fine grater, until a ¼ cupfull, tightly packed, of carrot gratings has been obtained. To ¼ cup of water, add ½ teaspoon of salt and stir until the salt has dissolved. Then add the grated carrots, mix well and set aside for 20 minutes. This gives an extract of the enzyme in the carrots. Pour the carrot-extract mix into a strainer, squeezing out the juice with a teaspoon and collect the enzyme solution, which will be more than ¼ cup.

Now stir the enzyme solution in the cup of pectin solution in the bowl or jar, mix well and set aside for exactly one hour. During this period the enzyme alters the pectin just enough to make delicious custards with milk, or fine jellied desserts with frozen or fresh fruit juices and fruits.

Put the following mixture in a kettle:

1 small can evaporated milk,
1 pint whole milk,
1 teaspoon of soluble powdered coffee,
¼ cup sugar (optional),
1½ teaspoons vanilla.

When the one hour for the enzymatic action of the carrot extract on the pectin solution is up, heat the foregoing milk mixture to a full boil and quickly add all of the pectin solution. Stir vigorously and pour immediately into a large bowl or custard dishes. The custard will thicken as it cools to the desired firmness of consistency.

A great many variations of these recipes may be used. Fruit juices can be jelled by introducing calcium salts. Ice creams of the custard type and the like may also be made.

Tomato aspic can be made with our pectin composition by using solid packed tomatoes (which now contain calcium chloride that has been added by the packer).

The ease with which our pectin composition goes into complete solution is due, first, to the insoluble and porous character of the pectin itself and to the coarseness of particle size, all of which insure rapid dispersion; and, secondly, to the presence of a sufficient amount of a solubilizing agent, which in the above formulae is sodium citrate, but which may be any dry, edible alkali metal salt of an organic oxy acid, to insure complete solution of the pectin rapidly in plain cool tap water. The porosity of the pectin particle aids in its dissolution, since solution on the inside as well as on the outside of the particle can take place simultaneously, if the particles are first dispersed, that is, are separated as discrete units suspended in the water. Once a complete solution of the pectin has been made, there is hardly anything that the operator can do, knowingly or unknowingly, in the subsequent operations that will prevent the making of a satisfactory product.

From the marketability standpoint, our dry 200 grade pectin composition has great utility and presents great savings. As contrasted with any liquid pectin on the market 7.1 grams (about a fourth of an ounce) is the equivalent in jelly unit values of eight ounces of liquid pectin, as such, and if the weight of the glass container is included is equivalent to nineteen ounces of bottled liquid pectin. Also, any commercial liquid pectin is perishable because it is a liquid; it deteriorates in a matter of months; it freezes; and it presents a risk of breakage of the glass container and loss by spillage.

Summing up the novel properties and characteristics of the pectin composition of our present invention, they are as follows:

(1) Our pectin composition is in dry, granular form, has a jelly grade of at least 150, and preferably 200, disperses readily as individual discrete particles when it is stirred into plain, cool water, and dissolves completely therein, without the application of heat, to give a solution having a pH of between 3.5 and 4.40.

(2) Our pectin composition is complete in itself, except for the addition thereto of such products as are readily available to the housewife, such as sugar, lemon juice, or the like, for making not only jellies and jams but also candies, custards and aspics, since our composition contains a sufficient amount of a solubilizing agent, sodium citrate or its equivalent, to dissolve the pectin in a relatively small amount of plain cool tap water.

(3) Our composition is of such high jelly grade, preferably 200, and contains such a small proportion of dextrose, if any, that 7.1 grams (about one fourth) of an ounce of the composition) is equivalent to eight ounces of any liquid pectin now on the market, and 7.1 grams of our composition will readily dissolve in eight fluid ounces of plain tap water to give a six and one-quarter jelly grade solution.

(4) Our pectin composition, when made from citrus pectin, represents the first citrus pectin ever to be made up into a water solution of such high jelly grade, containing such a small proportion of sugar, or total solids, to pectin. It is also the first dry pectin composition, to the best of our knowledge, that can be dissolved in water to give directly a solution having a pH within the range of from 3.5 to 4.4. Within this range, the solution of our pectin composition is stable even toward boiling, whereas with higher or lower pH values, solutions of pectin deteriorate rapidly upon boiling, due to hydrolysis or decomposition of the pectin. While it is not necessary, or even desirable, to boil a water dispersion of pectin in order to effect solution, boiling may be resorted to in making some of the products for which our pectin composition is so admirably suited.

It will be understood that modifications and variations may be effected without departing from the scope of the novel concepts of the present invention.

We claim as our invention:

1. A dry pectin composition consisting in admixture essentially of a porous, non-water soluble pectin of at least about 200 grade, said pectin being a substantially non-demethoxylated pectin and having been produced by rinsing a pectin-aluminum complex coprecipitate with acidified alcohol of from 0.5 to 2.0 pH, and then bringing the pectin to a pH of about 3.30 and recovering the same, and a dry edible alkali metal salt of a hydroxy substituted organic acid, said pectin and salt being substantially the same particle size and both within mesh sizes of from 30 to 80, the amount of said salt being that equivalent to from 2 to 10% of sodium citrate by weight on an equivalent basis of 100 grade pectin, 7.1 grams of said admixture being completely soluble in 8 fluid ounces of plain cool tap water upon being stirred thereinto for one minute and thereafter allowed to stand, and the resulting solution having a pH between 3.5 and 4.4 and a jelly grade of at least 6¼.

2. A dry, granular, non-caking jelly making composition having a jelly grade of at least 150 and consisting essentially of a non-water soluble, substantially non-demethoxylated pectin produced by precipitation as a complex of a polyvalent metal, said pectin having a particle size between 10 and 100 mesh, and an edible alkali metal salt of an organic oxy acid in granular form of similar mesh particle size to said pectin and in an amount sufficient by itself to effect complete dissolution of said pectin content when 7.1 grams of said composition are stirred into 8 fluid ounces of plain cool water, the resulting solution having a jelly grade of at least 6¼ and a pH of between 3.5 and 4.4.

3. A dry, granular, non-caking jelly-making composition having a jelly grade of at least about 200 and consisting essentially of a non-water soluble, substantially non-demethoxylated pectin produced by precipitation as a pectin-aluminum complex and having a particle size of between 30 and 80 mesh, and an edible alkali metal salt of an organic oxy acid selected from the group consisting of citric and tartaric acids, said alkali metal salt also having a particle size of between 30 and 80 mesh and being present in an amount equivalent to from 2 to 10 weight percent on the 100 grade pectin basis of the pectin in said composition, said composition being completely dissolved when 7.1 grams thereof are stirred into 8 fluid ounces of plain cool water to produce a solution having a pH of between 3.5 and 4.4 and a jelly grade of at least 6¼.

References Cited in the file of this patent

UNITED STATES PATENTS

| | | |
|---|---|---|
| 2,207,299 | Mnookin | July 9, 1940 |
| 2,334,281 | Olsen et al. | Nov. 16, 1943 |
| 2,369,846 | Olsen et al. | Feb. 20, 1945 |

FOREIGN PATENTS

| | | |
|---|---|---|
| 359,728 | Great Britain | Oct. 29, 1931 |

OTHER REFERENCES

"Pectin," compiled by William E. Ewell, published by Belle Reeves, Secretary of State, January 1939, W. P. A. Project No. 2839, O. P. No. 665–93–3–126, pages 30 and 31.